US012699006B2

(12) United States Patent
Kuter-Arnebeck et al.

(10) Patent No.: US 12,699,006 B2
(45) Date of Patent: Aug. 4, 2026

(54) THERMAL IMAGER DEVICES

(71) Applicant: Snap-on Incorporated, Kenosha, WI (US)

(72) Inventors: Ottoleo Kuter-Arnebeck, Kenosha, WI (US); Nicholas A. Gabbey, Mount Pleasant, WI (US)

(73) Assignee: Snap-on Incorporated, Kenosha, WI (US)

( * ) Notice: Subject to any disclaimer, the term of this patent is extended or adjusted under 35 U.S.C. 154(b) by 77 days.

(21) Appl. No.: 18/536,201

(22) Filed: Dec. 11, 2023

(65) Prior Publication Data

US 2024/0102863 A1 Mar. 28, 2024

Related U.S. Application Data

(63) Continuation of application No. 17/728,964, filed on Apr. 25, 2022, now Pat. No. 11,867,559.

(51) Int. Cl.
*G01J 5/02* (2022.01)
*G01J 5/00* (2022.01)
*G01J 5/04* (2006.01)

(52) U.S. Cl.
CPC ........... *G01J 5/0205* (2013.01); *G01J 5/0265* (2013.01); *G01J 5/04* (2013.01); *G01J 5/047* (2013.01); *G01J 2005/0077* (2013.01)

(58) Field of Classification Search
CPC ......... G01J 5/0205; G01J 5/0265; G01J 5/047
See application file for complete search history.

(56) References Cited

U.S. PATENT DOCUMENTS

| | | | |
|---|---|---|---|
| 5,572,913 | A | 11/1996 | Nasiell |
| 6,042,155 | A | 3/2000 | Lockwood |
| 7,250,603 | B1 | 7/2007 | Nugent |
| 7,435,248 | B2 | 10/2008 | Krattiger et al. |
| 8,102,424 | B2 | 1/2012 | Sheard et al. |
| 8,189,043 | B2 | 5/2012 | Schneider et al. |
| 8,907,282 | B2 | 12/2014 | Pickett et al. |
| 9,083,865 | B2 | 7/2015 | Wu |
| 9,095,127 | B2 | 8/2015 | Kovarik et al. |
| 9,196,026 | B2 | 11/2015 | Heinke |
| 9,204,062 | B2 | 12/2015 | Bergstrom et al. |
| 9,723,229 | B2 | 8/2017 | Nguyen et al. |
| 9,736,342 | B2 | 8/2017 | Mueckl |

(Continued)

FOREIGN PATENT DOCUMENTS

CN 107543578 1/2018

*Primary Examiner* — Carolyn Fin
(74) *Attorney, Agent, or Firm* — McDonnell Boehnen Hulbert & Berghoff LLP

(57) ABSTRACT

A thermal imager device, where the thermal imager device includes a thermal imager housing. The thermal imager housing includes a display and user controls. The thermal imager device also includes a removable detector housing including a thermal detector. The thermal imager device also includes a flexible connector configured to detachably couple the removable detector to the thermal imager housing, the flexible connector including a first end, a second end, and a body between the first end and the second end, where the flexible connector is configured to detachably couple to the thermal imager housing at the first end, and where the flexible connector is configured to detachably couple to the removable detector housing at the second end.

20 Claims, 7 Drawing Sheets

(56) References Cited

U.S. PATENT DOCUMENTS

| | | | |
|---|---|---|---|
| 9,883,084 B2 | 1/2018 | Nguyen et al. | |
| 10,477,079 B2 | 11/2019 | Mueckl et al. | |
| 10,506,193 B2 | 12/2019 | Ruther et al. | |
| 10,623,668 B2 | 4/2020 | Covington et al. | |
| 10,728,468 B2 | 7/2020 | McManus et al. | |
| 10,764,514 B1 | 9/2020 | Hoevenaar et al. | |
| 11,022,546 B2 | 6/2021 | Schmidt et al. | |
| 11,070,763 B2 | 7/2021 | Hoevenaar et al. | |
| 11,082,589 B2 | 8/2021 | Mueckl et al. | |
| 11,187,586 B2 | 11/2021 | Wynick et al. | |
| 11,224,966 B2 | 1/2022 | Kuter-Arnebeck et al. | |
| 2005/0024495 A1 | 2/2005 | Hamrelius et al. | |
| 2006/0167340 A1 | 7/2006 | Pease et al. | |
| 2006/0289768 A1 | 12/2006 | Vallese et al. | |
| 2007/0185379 A1 | 8/2007 | Newman et al. | |
| 2008/0026647 A1 | 1/2008 | Boehnlein et al. | |
| 2009/0090864 A1 | 4/2009 | Glatzmaier | |
| 2012/0001768 A1 | 1/2012 | Radosavljevic et al. | |
| 2013/0155248 A1 | 6/2013 | Neeley et al. | |
| 2013/0155249 A1 | 6/2013 | Neeley et al. | |
| 2014/0300748 A1 | 10/2014 | Kane et al. | |
| 2015/0054942 A1 | 2/2015 | Coombs et al. | |
| 2015/0057952 A1 | 2/2015 | Coombs et al. | |
| 2016/0076936 A1 | 3/2016 | Schoch et al. | |
| 2016/0080667 A1 | 3/2016 | Stuart et al. | |
| 2016/0140764 A1* | 5/2016 | Bickerstaff | G06F 3/011 |
| | | | 345/633 |
| 2017/0310858 A1 | 10/2017 | Mueckl et al. | |
| 2019/0037152 A1 | 1/2019 | Uda et al. | |
| 2020/0003623 A1 | 1/2020 | Bellifemine | |
| 2020/0094365 A1* | 3/2020 | Beall | B64F 5/10 |
| 2021/0136328 A1 | 5/2021 | Barthel et al. | |
| 2021/0218909 A1 | 7/2021 | Schmidt et al. | |
| 2021/0364357 A1 | 11/2021 | Seo et al. | |

* cited by examiner

THERMAL IMAGER DEVICES

CROSS-REFERENCE TO RELATED APPLICATION

The present application is a continuation of U.S. patent application Ser. No. 17/728,964, filed Apr. 25, 2022, which is hereby incorporated by reference.

BACKGROUND

Technicians use a variety of tools to diagnose various items, such as a vehicle, a house, a building, or a component or system on or in one of those items, such as a window or a heating, ventilation, and air conditioning (HVAC) system. In some instances the diagnosis pertains to a temperature of the item. Under those and other circumstances, the technician may use a thermal imager device to capture a thermal image of the item under diagnosis.

Often, access to the various items described above (e.g., a vehicle, a house, a building, or a component or system) is limited or restricted and thus difficult for a technician to obtain an accurate reading using a thermal imager device. Additionally, a technician may not have a clear line of sight to the area in which the technician is attempting to image.

OVERVIEW

Several example implementations relate to a thermal imager device that captures and/or displays images including an image captured by a visible light camera, an image captured by a thermal camera, or a blended imaged based on the images captured by the visible light and thermal cameras. In an example embodiment, the thermal imager device includes a flexible connector between a body of the thermal imager device and a thermal detector. Namely, the thermal imager device is modularized such that a flexible connector may optionally be utilized between a main body of the thermal imager device and a thermal detector. Such a flexible connector can provide access to areas which may otherwise be difficult to reach or restricted.

In a first implementation, a thermal imager device is provided. The thermal imager device includes a thermal imager housing, the thermal imager housing including a display and user controls. The thermal imager device also includes a removable detector housing including a thermal detector. The thermal imager device further includes a flexible connector configured to detachably couple the removable detector to the thermal imager housing, the flexible connector comprising a first end, a second end, and a body between the first end and the second end, where the flexible connector is configured to detachably couple to the thermal imager housing at the first end, and where the flexible connector is configured to detachably couple to the removable detector housing at the second end.

In a second implementation, another example thermal imager device is provided. The thermal imager device includes a thermal imager housing, the thermal imager housing including a display and user controls. The thermal imager device further includes a removable detector housing comprising a thermal detector, where the removable detector housing includes a first connector, where the thermal imager housing includes a second connector, and where the removable detector housing is configured to detachably couple directly to the thermal imager housing by coupling the first connector to the second connector.

In an embodiment of the thermal imager device, the thermal imager housing is configured to detachably couple directly to the removable detector housing.

In an embodiment of the thermal imager device, the removable detector housing includes a camera and a light.

In an embodiment of the thermal imager device, the first end of the flexible connector includes a first magnetic connector, where the thermal imager housing includes a second magnetic connector, and where the first end of the flexible connector is configured to detachably couple to the thermal imager housing by coupling the first magnetic connector to the second magnetic connector.

In an embodiment of the thermal imager device, the second end of the flexible connector includes a third magnetic connector, where the thermal imager housing includes a fourth magnetic connector, and where the second end of the flexible connector is configured to detachably couple the removable detector housing by coupling the third magnetic connector to the fourth magnetic connector.

In an embodiment of the thermal imager device, the first end of the flexible connector includes a first mechanical fastener and the thermal imager housing includes a second mechanical fastener, where the first end of the flexible connector is configured to detachably couple to the thermal imager housing by coupling the first mechanical fastener to the second mechanical fastener.

In an embodiment of the thermal imager device, the second end of the flexible connector includes a third mechanical fastener and the removable detector housing includes a fourth mechanical fastener, where the second end of the flexible connector is configured to detachably couple to the removable detector housing by coupling the third mechanical fastener to the fourth mechanical fastener.

In an embodiment of the thermal imager device, the flexible connector includes electrically non-conductive material.

In an embodiment of the thermal imager device, the flexible connector includes a plurality of links and where each link of the plurality of links is frictionally coupled to another link of the plurality of links.

In an embodiment of the thermal imager device, the flexible connector is semi-rigid such that the flexible connector is adjustable upon application of a force.

In an embodiment of the thermal imager device, the flexible connector includes a first electrical component on the first side of the flexible connector and a second electrical component on the second side of the flexible connector, where the first electrical connector is configured to electrically couple to a third electrical component on the thermal imager housing, and where the second electrical component is configured to electrically couple to a fourth electrical component on the removable detector housing.

In an embodiment of the thermal imager device, the flexible connector houses a flexible electrical wire electrically connecting the first electrical component and the second electrical component.

In an embodiment of the thermal imager device, the body of the flexible connector includes a plastic material.

In an embodiment of the thermal imager device, the thermal imager housing houses a first communication unit and the removable detector housing houses a second communication unit, and wherein the first communication unit and second communication unit are configured to communicate via a wireless connection.

In an embodiment of the thermal imager device, the thermal imager housing is coupled to a handle and where the user control includes a trigger button on the handle.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

Figures 1, 2:
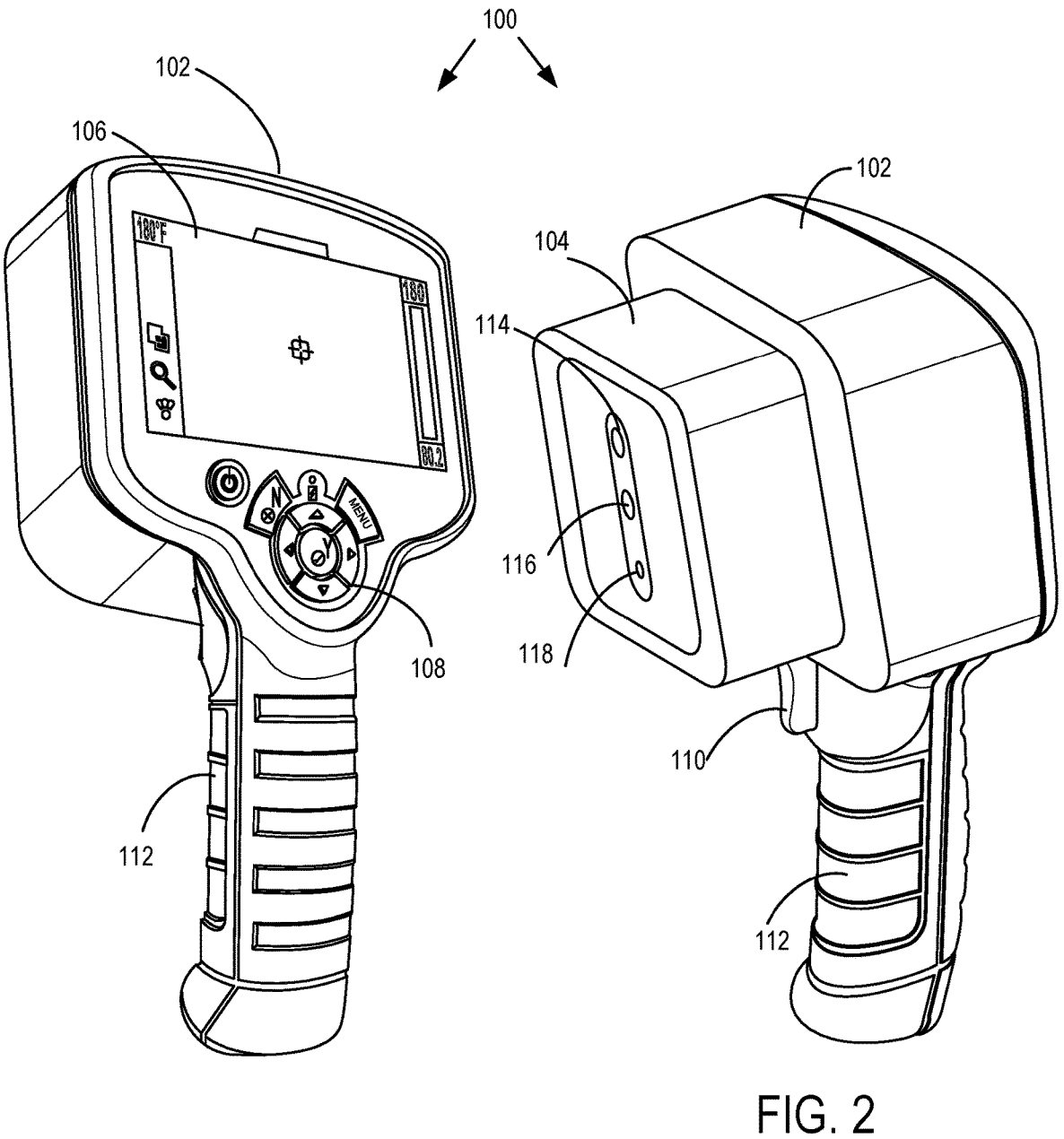
FIG. 1 illustrates a perspective view of a thermal imager device, according to an example embodiment.
FIG. 2 illustrates another perspective view of a thermal imager device, according to an example embodiment.
Figures 3, 4:
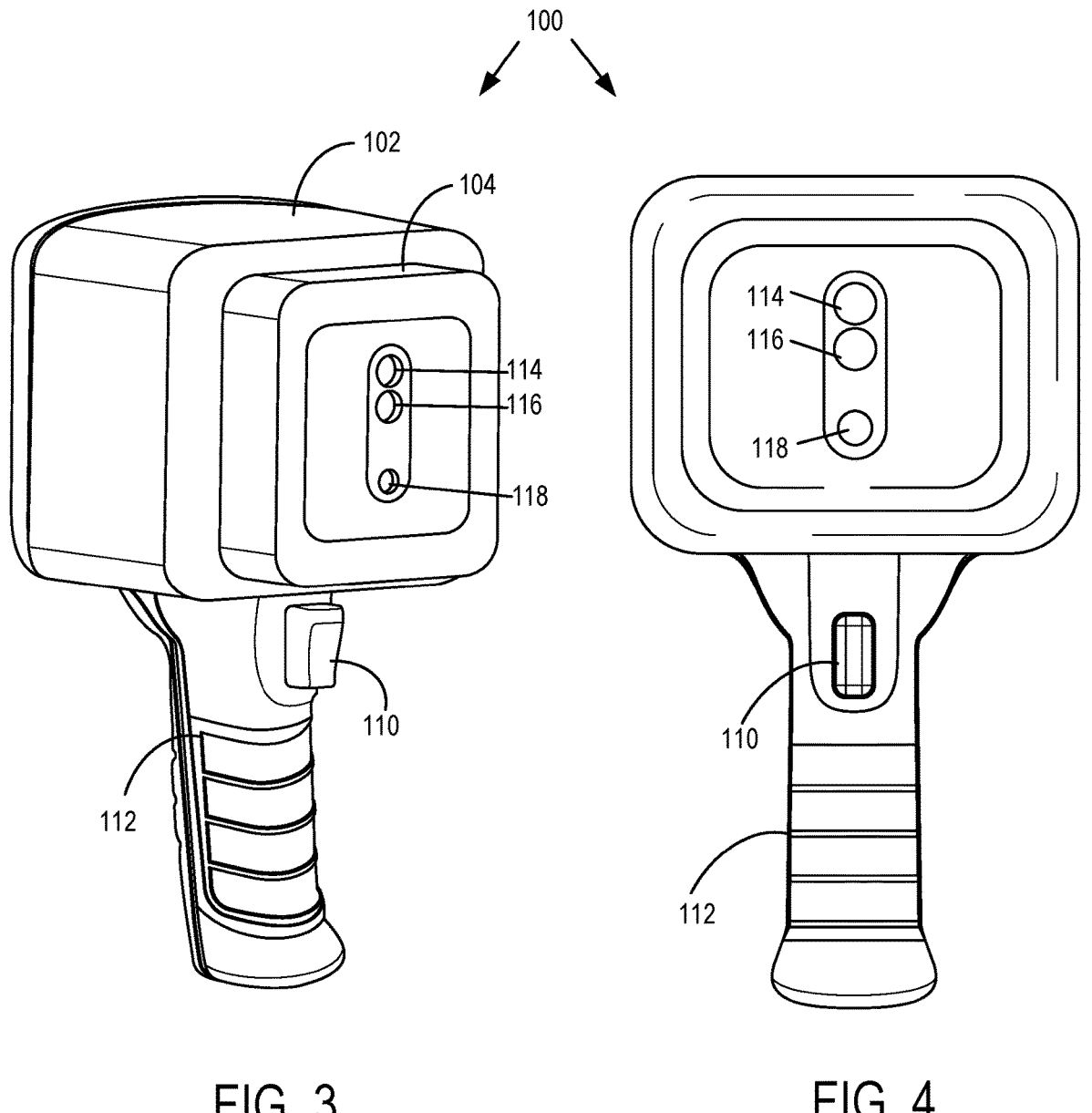
FIG. 3 illustrates another perspective view of a thermal imager device, according to an example embodiment.
FIG. 4 illustrates a plan view of a thermal imager device, according to an example embodiment.
Figure 5:
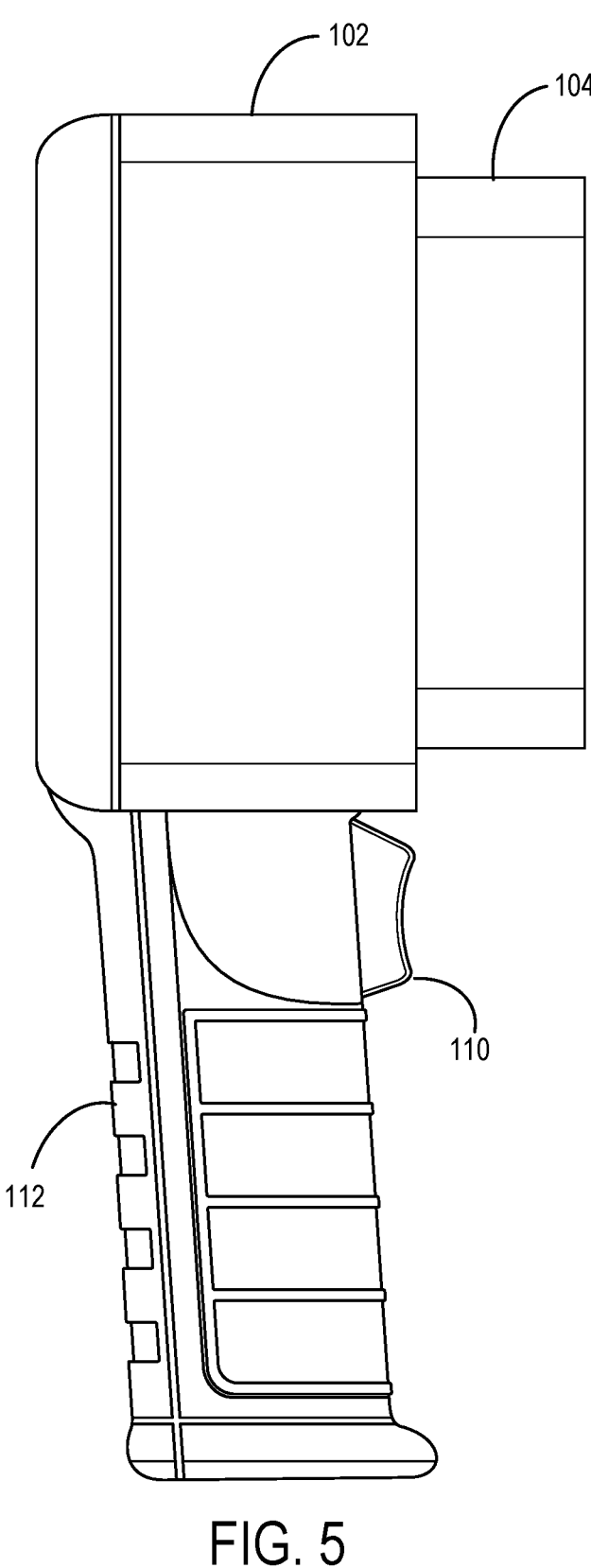
FIG. 5 illustrates a side view of a thermal imager device, according to an example embodiment.

This description describes several example embodiments, at least some which relate to thermal imager devices. In example embodiments, the thermal imager device is modularized such that a flexible connector may optionally be utilized between a main body of the thermal imager device and a thermal detector. Such a flexible connector can provide access to areas which may be otherwise be difficult to reach or restricted.

FIGS. 1-5 illustrate an example thermal imager device 100, according to an example embodiment. The thermal imager device 100 includes a thermal imager housing 102 and a removable detector housing 104, the removable detector housing 104 including a thermal detector 114. As described in more detail below the removable detector housing 104 is configured to detachably couple directly to the thermal imager housing 102.

In example embodiments, the thermal imager housing 102 includes a display 106, user controls 108, and a handle 112. The handle 112 may additionally include a trigger button 110. Further, the thermal imager housing 102 can include a computing device housed within the thermal imager housing 102. The computing device includes at least one processor and data storage including program instructions stored thereon that when executed by the at least one processor, cause the thermal imager device 100 to perform one or more of the functions described herein. In examples, the processor is communicatively coupled to the thermal detector 114, such that the processor receives data from the thermal detector 114, as described in more detail below.

In example embodiments, the display 106 includes a display for displaying content of a communication transmitted by the removable detector housing 104 and/or a menu that can be navigated using the user controls 108. The display 106 can include a capacitive touch screen display, a resistive touch screen display, a plasma display, an LED display, a cathode ray tube display, an OLED display, and/or an LCD. The display 106 can include a touch screen display with the LCD. For instance, the display 106 can include a capacitive (such as a projective capacitive) touch screen display or a resistive touch screen display. Other examples of the display 106 are possible.

The user controls 108 include controls, such as one or more control buttons (or more simply, "buttons" or "keys") that can be used to control operation of the thermal imager device 100. A control button or key can be used to enter a selection or information for the thermal imager device 100.

As an example, a control button of the user controls 108 can be operatively connected to the processor. In response to use of the control button (e.g., pressing the control button and/or releasing the control button while pressed), the processor can detect a change in an electrical signal input to the processor to detect that the control button is being used or was used, and perform a control function related to the control button at the time the control button is being used or was used. One or more control buttons of the user controls 108 can be used to navigate a menu displayed on the display 106.

In an example implementation in which the computing device includes a touch screen display, one or more control functions discussed in this disclosure as being performed to by computing device can be performed by touching the touch screen display while displaying an applicable touch screen display control.

As noted above, the removable detector housing 104 houses the thermal detector 114. In example embodiments, the removable detector housing 104 can additionally house a camera 116 and a light 118.

In an example implementation, the camera 116 includes a visible light camera and the thermal detector 114 includes a thermal camera. The thermal camera can be referred to as a "thermal detector." In this implementation, the visible light camera 116 can include a visible sensor array to capture visible light radiation and output a visible light image, and the thermal camera 114 can include a thermal sensor array to capture infrared radiation and output a thermal image. The thermal sensor array can output radiometry to provide a thermal image with measurements.

In an example embodiment, the camera 116 is a visible light camera configured to generate visible light images having a first resolution (e.g., a first number of pixels) and the thermal detector 114 is a thermal camera configured to generate thermal images having a second resolution, different than the first resolution. For instance, the resolution of the camera 116 can be 640 pixels wide×480 pixels high and the resolution of the thermal camera can be 80 pixels wide by 60 pixels high.

The visible light camera 116 can include a sensor array to detect intensities and wavelengths (e.g., 380 nanometers (nm) to 750 nm) of visible light radiation that is visible to a human eye. The visible sensor array of the visible light camera can include a charge-coupled device (CCD) image sensor array, a complementary metal oxide semi-conductor (CMOS) imager sensor array, and/or one or more other optical elements that is/are known in the art.

The thermal detector 114 can include a sensor array to detect intensities and wavelengths of infrared radiation (e.g., 750 nm to 1 millimeter (mm)). As an example, the thermal camera can include a bolometer sensor array (e.g., an uncooled micro-bolometer) or a thermopile infrared sensor array. Additionally or alternatively, the thermal detector 114 can include ferroelectric materials and/or may include a pyroelectric element.

In example embodiments, the removable detector housing 104 may also house a computing device similar to the computing device of the thermal imager housing 102. Namely, the computing device includes at least one processor and data storage including program instructions stored thereon that when executed by the at least one processor, cause components of the removable detector housing 104 (e.g., thermal detector 114, camera 116, and/or light 118) to perform one or more of the functions described herein. In examples, the processor housed in the removable detector housing 104 is communicatively coupled to the processor housed in the thermal imager housing 102, such that the processors transmit and receive data from one another, as described in more detail below.

In example embodiments, the removable detector housing 104 may house a power source, such as rechargeable and/or removable batteries.

Figure 6A:
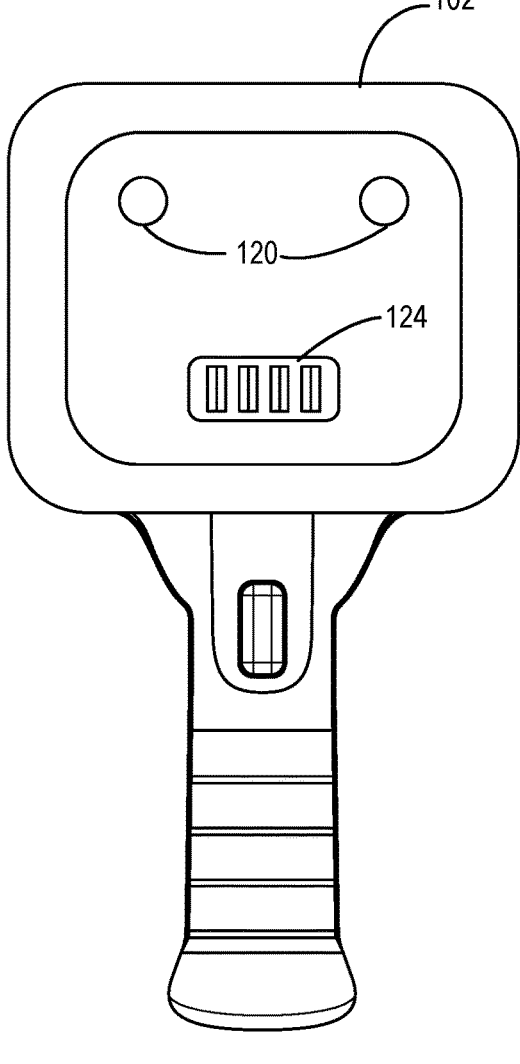
FIG. 6A illustrates a plan view of a thermal imager housing, according to an example embodiment.
Figure 6B:
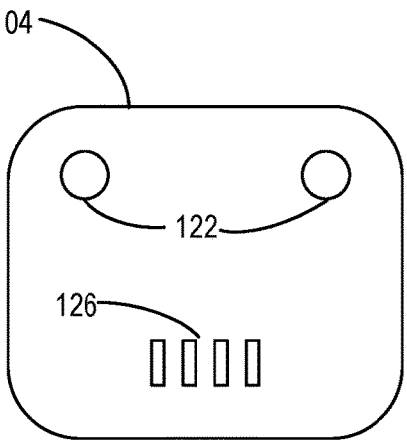
FIG. 6B illustrates a plan view of a removable detector housing, according to an example embodiment.

FIGS. 6A and 6B illustrate plan views of aspects of the thermal imager device 100, according to example embodiments. FIG. 6A illustrates a front view of the thermal imager housing 102, according to an example embodiment. FIG. 6B illustrates a back view of the removable detector housing 104, according to an example embodiment.

In example embodiments, the back of the thermal imager housing 102 can detachably couple to the front of the removable detector housing 104 by way of mating fasteners 120, 122. More particularly, the thermal imager housing 102 can include one or more fasteners 120 and the removable detector housing 104 can include one or more mating fasteners 122 configured to detachably couple to the one or more fastener 120.

In some examples, the fasteners 120, 122 can include one or more mating magnetic connectors. More particularly, fastener 120 on the thermal imager housing 102 can include a magnetic connector and fastener 122 on the removable detector housing can include a mating magnetic connector. Thus, the thermal imager housing 102 can detachably couple to the removable detector housing 104 by coupling the mating magnetic connectors together.

In another example, the mating fasteners 120, 122 may include mating mechanical fasteners. For example, fastener 120 on the thermal imager housing 102 may include one or more female fasteners and fastener 122 on the removable detector housing may include one or more male fasteners. Thus, the thermal imager housing can detachably couple to the removable detector housing by coupling the female fastener on the thermal imager housing 102 to the male fastener on the removable detector housing 104.

Many example of mating mechanical fasteners are possible. For instance, example mechanical fasteners may include, but are not limited to, physical connectors, clips, pins, and/or positive and negative latches, or other retention features.

In examples, it may be advantageous to utilize magnetic connectors for the mating fasteners 120, 122, as magnetic connectors allow for quick release of the corresponding components (e.g., the thermal imager 102 and the removable detector housing 104). In other examples, it may be advantageous to utilize mechanical fasteners to provide a more stabilized connection between the corresponding components. Physical connectors, clips, pins, positive and negative latches, and retention features described herein may have different performance with respect to quick release of the corresponding components and stabilized connection between the corresponding components. For example, clips may allow for more quick release of the corresponding components than pins or latches. As another example, latches may provide a more stabilized connection between the corresponding components than pins or clips.

Additionally or alternatively, the thermal imager housing 102 may include a negative cavity to receive the removable detector housing 104.

Further, the back of the thermal imager housing 102 can detachably electrically couple to the front of the removable detector housing 104 by way of mating electrical connectors 124, 126. More particularly, the electrical connector 124 on the thermal imager housing 102 may include one or more electrical pins and electrical connector 126 on the removable detector housing may include one or more mating electrical pins. Thus, the thermal imager housing 102 can electrically couple to the removable detector housing 104 by coupling the electrical pins of electrical connector 124 and the mating electrical pins of electrical connector 126. Although the example embodiment shown in FIGS. 6A and 6B illustrate mating 4-pin electrical connectors, other configurations are possible (e.g., 2-pin electrical connector, 3-pin electrical connector, etc.).

Further, in example embodiments, the mating electrical connectors 124, 126 allow data transfer between components of the thermal imager housing 102 and components of the removable detector housing 104. For instance, when the thermal imager housing 102 and the removable detector housing 104 are electrically coupled to one another, the computing device housed in the thermal imager housing 102 may send an instruction to the thermal detector 114 and corresponding components, for example, to capture a thermal image. And, the computing device may receive data corresponding to the thermal image from the thermal detector 114 and corresponding components.

Additionally or alternatively, in some example embodiments, components of the thermal imager housing 102 may be able to transfer data to components of the removable detector housing 104 by way of a wireless connection.

In these examples, the removable detector housing 104 may additionally include a computing device, similar to the computing device of the thermal imager housing 102. Namely, the computing device includes at least one processor and data storage including program instructions stored thereon that when executed by the at least one processor, cause components of the removable detector housing 104 (e.g., thermal detector 114) to perform one or more of the functions described herein. Both computing device of the thermal imager housing 102 and the computing device of the removable detector housing 104 may include respective communication units.

The computing devices of the thermal imager housing 102 and the removable detector housing 104 may then communicate via a wireless communication link in accordance with one or more wireless communication standards or protocols. For example, the communication link can include, a network, a Bluetooth, a Z-Wave network, a ZigBee, and/or other suitable wireless communication protocol network.

Although in example embodiments described above the back of the thermal imager housing 102 detachably couples to the front of the removable detector housing 104, in other embodiments another side of a thermal imager housing detachably couples to another side of a removable detector housing. For example, in some embodiments the front of a thermal imager housing 102 detachably couples to the back of a removable detector housing 104.

Further, although in example embodiments described above the back of the thermal imager housing 102 detachably electrically couples to the front of the removable detector housing 104, in other embodiments another side of a thermal imager housing 102 detachably couples to another side of a removable detector housing 104. For example, in some embodiments the front of a thermal imager housing 102 detachably electrically couples to the back of a removable detector housing 104.

Figures 7A, 7B:
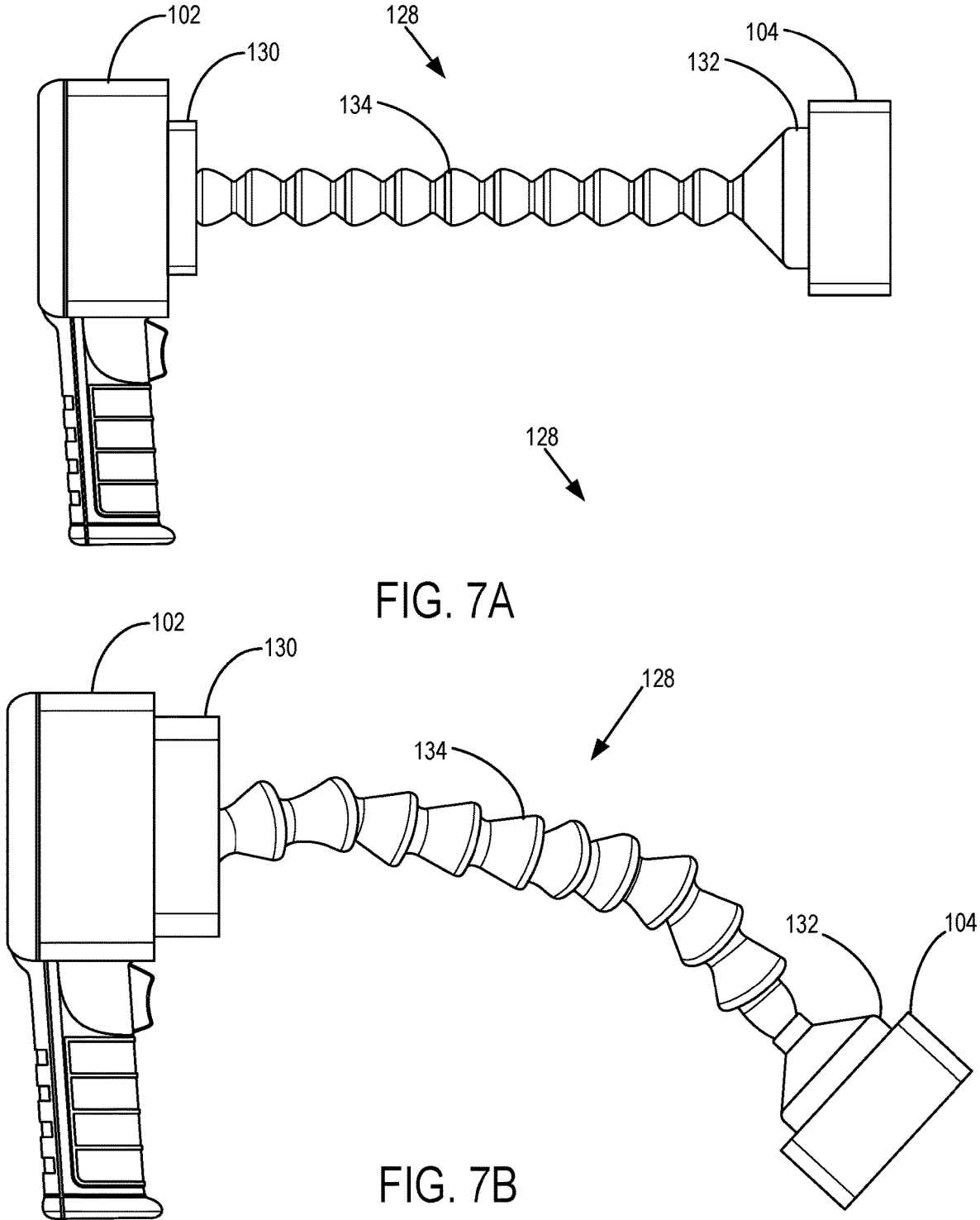
FIG. 7A illustrates a thermal imager device in which a flexible connector is in a first configuration and a removable detector housing is in a first position, according to an example embodiment.
FIG. 7B illustrates a thermal imager device in which a flexible connector is in a second configuration and a removable detector housing is in a second position, according to an example embodiment.

FIGS. 7A and 7B illustrate the thermal imager housing 102, a flexible connector 128, and the removable detector housing 104, according to example embodiments. As noted above, in practice, areas may be difficult to access to obtain a thermal image. Accordingly, the thermal image device 100 described herein may incorporate a flexible connector 128 to provide an extension between the thermal imager housing 102 and the removable detector housing 104, improving access to such restricted and difficult to reach areas.

More particularly, in examples, the flexible connector 128 can be utilized between the thermal imager housing 102 and the removable detector housing 104. The flexible connector 128 can include a first end 130 and second end 132, with a body 134 between the first end 130 and the second end 132. The first end 130 of the flexible connector 128 can detachably couple to thermal imager housing 102 and the second end 132 of the flexible connector 128 can detachably couple to the removable detector housing 104.

In examples, the body 134 of the flexible connector 128 is semi-rigid such that it is adjustable upon application of a force, but can hold the removable detector housing 104 in a fixed position during use of the thermal imager device 100 (e.g., capturing a thermal image). For instance, a user can manually apply a force (e.g., using their hands) to adjust the configuration of the flexible connector 128.

In practice, a user can capture a first thermal image via the thermal imager device 100 with the flexible connector 128 in a first configuration and the removable detector housing 104 in a first position, as shown in FIG. 7A. The user can then manually adjust the flexible connector 128 such that the flexible connector 128 is in a second configuration and the removable detector housing 104 is in a second position, as shown in FIG. 7B. After the flexible connector 128 is adjusted such that it is in the second configuration and the removable detector housing 104 is in the second position, the user can capture a second thermal image via the thermal imager device 100. Accordingly, the flexible connector 128 can allow the user to capture thermal images in areas which may otherwise be restricted or difficult to access.

In some examples, the body 134 has a length between the first end 130 and second 132 of between 6 and 24 inches. In some examples, the body 134 has a length between the first end 130 and second 132 of between 6 and 8 inches. In some examples, the body 134 has a length between the first end 130 and second 132 of between 6 and 12 inches. In some examples, the body 134 has a length between the first end 130 and second 132 of between 12 and 18 inches. In some examples, the body 134 has a length between the first end 130 and second 132 of between 12 and 24 inches. Other lengths of the body 134 are possible.

Even further, the user can remove the flexible connector 128 to directly couple the removable detector housing 104 to the thermal imager housing 102 to capture a third thermal image, for example. As such, the various configurations of the thermal imager device 100 allow the user to capture thermal images with and without the flexible connector 128.

Figure 8:
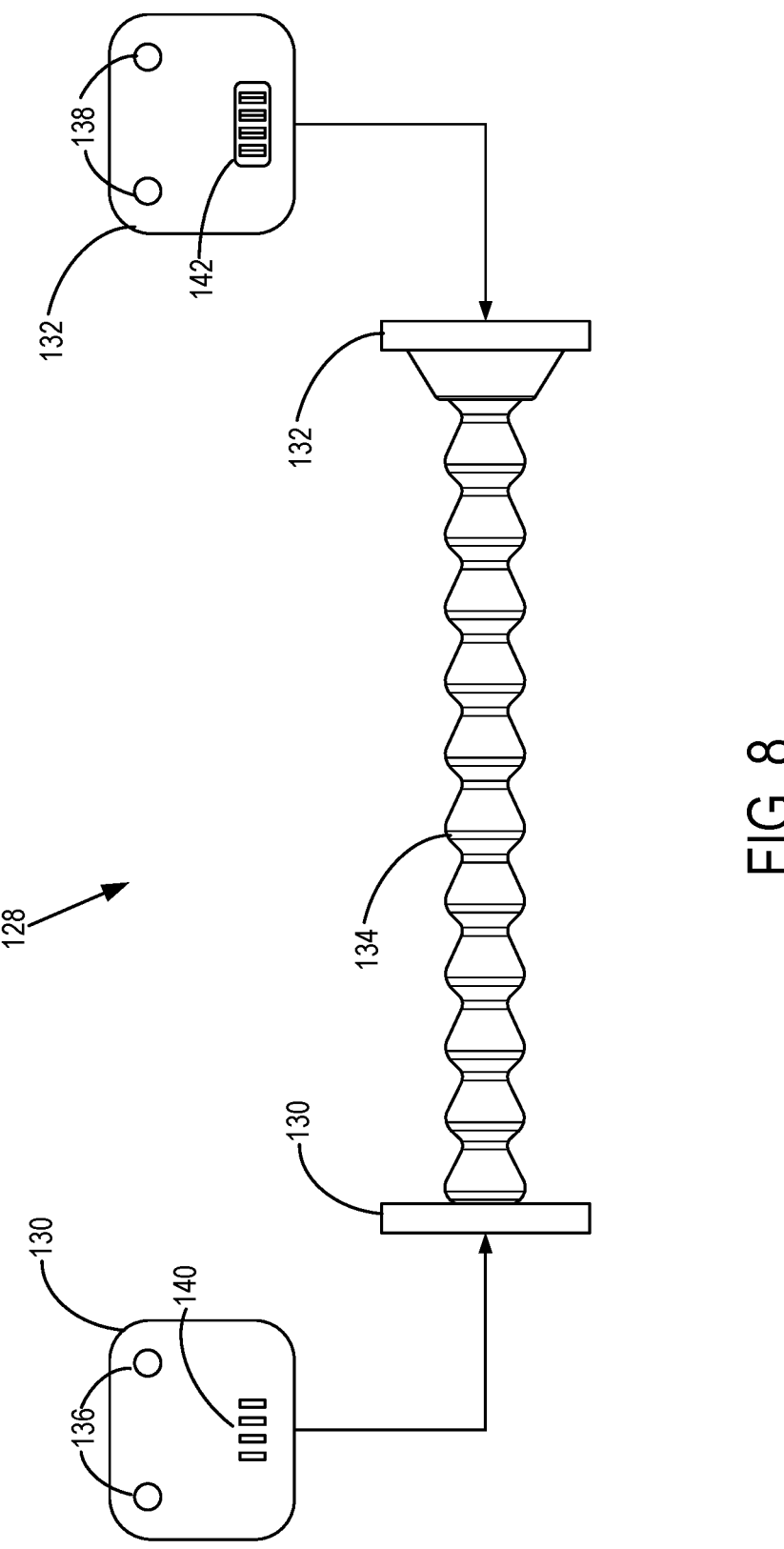
FIG. 8 illustrates a flexible connector, according to an example embodiment.

FIG. 8 illustrates the flexible connector 128, according to an example embodiment. In example embodiments, the first end 130 and the second end 132 of the flexible connector 128 include fasteners 136, 138 and electrical connectors 140, 142.

More particularly, the first end 130 of the flexible connector 128 can detachably couple to the back of the thermal imager housing 102 by way of mating fasteners 120, 136. More particularly, the thermal imager housing 102 can include one or more fasteners 120 and the first end 130 of the flexible connector 128 can include one or more mating fasteners 136 configured to detachably couple to the one or more fastener 120.

In some examples, the fasteners 120, 136 can include one or more mating magnetic connectors. More particularly, fastener 120 on the thermal imager housing 102 can include a magnetic connector and fastener 136 on the first end 130 of the flexible connector 128 can include a mating magnetic connector. Thus, the thermal imager housing 102 can detachably couple to the first end 130 of the flexible connector 128 by coupling the mating magnetic connectors together.

In another example, the fasteners 120, 136 may include mating mechanical fasteners. For example, fastener 120 on the thermal imager housing 102 may include one or more female fasteners and fastener 136 on the first end 130 of the flexible connector 128 may include one or more male fasteners. Thus, the thermal imager housing 102 can detachably couple to the first end 130 of the flexible connector 128 by coupling the female fastener on the thermal imager housing 102 to the male fastener on the first end 130 of the flexible connector 128. Many example of mating mechanical fasteners are possible as described above in connection with mating fasteners 120, 122.

Similarly, the second end 132 of the flexible connector 128 can detachably couple to the front of the removable detector housing 104 by way of mating fasteners 122, 138. More particularly, the removable detector housing 104 can include one or more fasteners 122 and the second end 132 of the flexible connector 128 can include one or more mating fasteners 138 configured to detachably couple to the one or more fastener 122.

In some examples, the fasteners 122, 138 can include one or more mating magnets. More particularly, fastener 122 on the removable detector housing 104 can include a magnetic connector and fastener 138 on the second end 132 of the flexible connector 128 can include a mating magnetic connector. Thus, the removable detector housing 104 can detachably couple to the second end 132 of the flexible connector 128 by coupling the mating magnetic connectors together.

In another example, the mechanical fasteners 122, 138 may include mating mechanical fasteners. For example, fastener 122 on the removable detector housing 104 may include one or more female fasteners and fastener 138 on the second end 132 of the flexible connector 128 may include one or more male fasteners. Thus, the removable detector housing 104 can detachably couple to the second end 132 of the flexible connector 128 by coupling the female fastener on the removable detector housing 104 to the male fastener on the second end 132 of the flexible connector 128. Many example of mating mechanical fasteners are possible as described above in connection with mating fasteners 120, 122.

In examples, the fastener 120 on the thermal imager housing 102 is the same type as, or substantially similar to, the fastener 138 on the second end 132 of the flexible connector 128. And the fastener 122 on the removable detector housing 104 is the same type as, or substantially similar to, the fastener 136 on the first end 130 of the flexible connector 128. This configuration allows the removable detector housing 104 to easily be removed from the thermal imager housing 102 and reattached to the second end 132 of the flexible connector 128. This configuration also allows for coupling of the first end 130 of the flexible connector 128 to the thermal imager housing 102, in place of the removable detector housing 104.

Further, the back of the thermal imager housing 102 can detachably electrically couple to the first end 130 of the flexible connector 128 by way of mating electrical connectors 124, 140. More particularly, the electrical connector 124 on the thermal imager housing 102 may include one or more electrical pins and electrical connector 140 on the first end 130 of the flexible connector 128 may include one or more mating electrical pins. Thus, the thermal imager housing 102 can electrically couple to the first end 130 of the flexible connector 128 by coupling the electrical pins of electrical connector 124 and the mating electrical pins of electrical connector 140.

Similarly, the front of the removable detector housing 104 can detachably electrically couple to the second end 132 of the flexible connector 128 by way of mating electrical connectors 126, 142. More particularly, the electrical connector 126 on the removable detector housing 104 may include one or more electrical pins and electrical connector 142 on the second end 132 of the flexible connector 128 may include one or more mating electrical pins. Thus, the removable detector housing 104 can electrically couple to the second end 132 of the flexible connector 128 by coupling the electrical pins of electrical connector 126 and the mating electrical pins of electrical connector 142. Many examples of mating electrical connectors are possible.

In examples, the body 134 of the flexible connector 128 includes components to facilitate electrically coupling the first end 130 and the second end 132 of the flexible connector 128. For example, the flexible connector 128 can be at least partially hollow to allow the passage of wires electrically connecting the first end 130 to the second end 132. The wires may be flexible to allow for adjustments of the configuration of the flexible connector 128, for example, as shown in FIGS. 7A and 7B.

Although in example embodiments described above the back of the thermal imager housing 102 detachably couples to the first end 130 of the flexible connector 128, in other embodiments another side of a thermal imager housing 102 detachably couples to another side of the flexible connector 128. For example, the front of a thermal imager housing 102 detachably couples to the second end 132 of the flexible connector 128.

Similarly, although in example embodiments described above the front of the removable detector housing 104 detachably couples to the second end 132 of the flexible connector 128, in other embodiments another side of a removable detector housing 104 detachably couples to another side of the flexible connector 128. For example, the back of a removable detector housing 104 detachably couples to the first end 130 of the flexible connector 128.

Further, although in example embodiments described above the back of the thermal imager housing 102 detachably electrically couples to the first end 130 of the flexible connector 128, in other embodiments another side of a thermal imager housing 102 detachably couples to another side of the flexible connector 128. For example, the front of a thermal imager housing 102 detachably electrically couples to the second end 132 of the flexible connector 128.

Similarly, although in example embodiments described above the front of the removable detector housing 104 detachably electrically couples to the second end 132 of the flexible connector 128, in other embodiments another side of a removable detector housing 104 detachably couples to another side of the flexible connector 128. For example, the back of a removable detector housing 104 detachably electrically couples to the first end 130 of the flexible connector 128.

Further, the body 134 of the flexible connector 128 can include electrically non-conductive material, so as to avoid interference of the wires. One example of such a material is acetal copolymer material, which may include polyoxymethylene. Many other plastics and/or other non-conductive electrical materials may be utilized for the flexible connector 128.

In example embodiments, the electrical connectors 140, 142 on the first end 130 and the second end 132 allow data transfer between components of the thermal imager housing 102 and components of the removable detector housing 104 via the wires housed within the flexible connector 128.

As such, when the thermal imager housing 102 is electrically coupled to the first end 130 of the flexible connector 128 and the removable detector housing 104 is electrically coupled to the second end 132 of the flexible connector 128, the computing device housed in the thermal imager housing 102 may send an instruction to the thermal detector 114 and corresponding components, for example, to capture a thermal image. And, the computing device may receive data corresponding to the thermal image from the thermal detector 114 and corresponding components. In some examples, the mating electrical connectors 140, 142 allow power transfer between components of the thermal imager housing 102 and components of the removable detector housing 104 in addition to data.

Figures 9A, 9B:
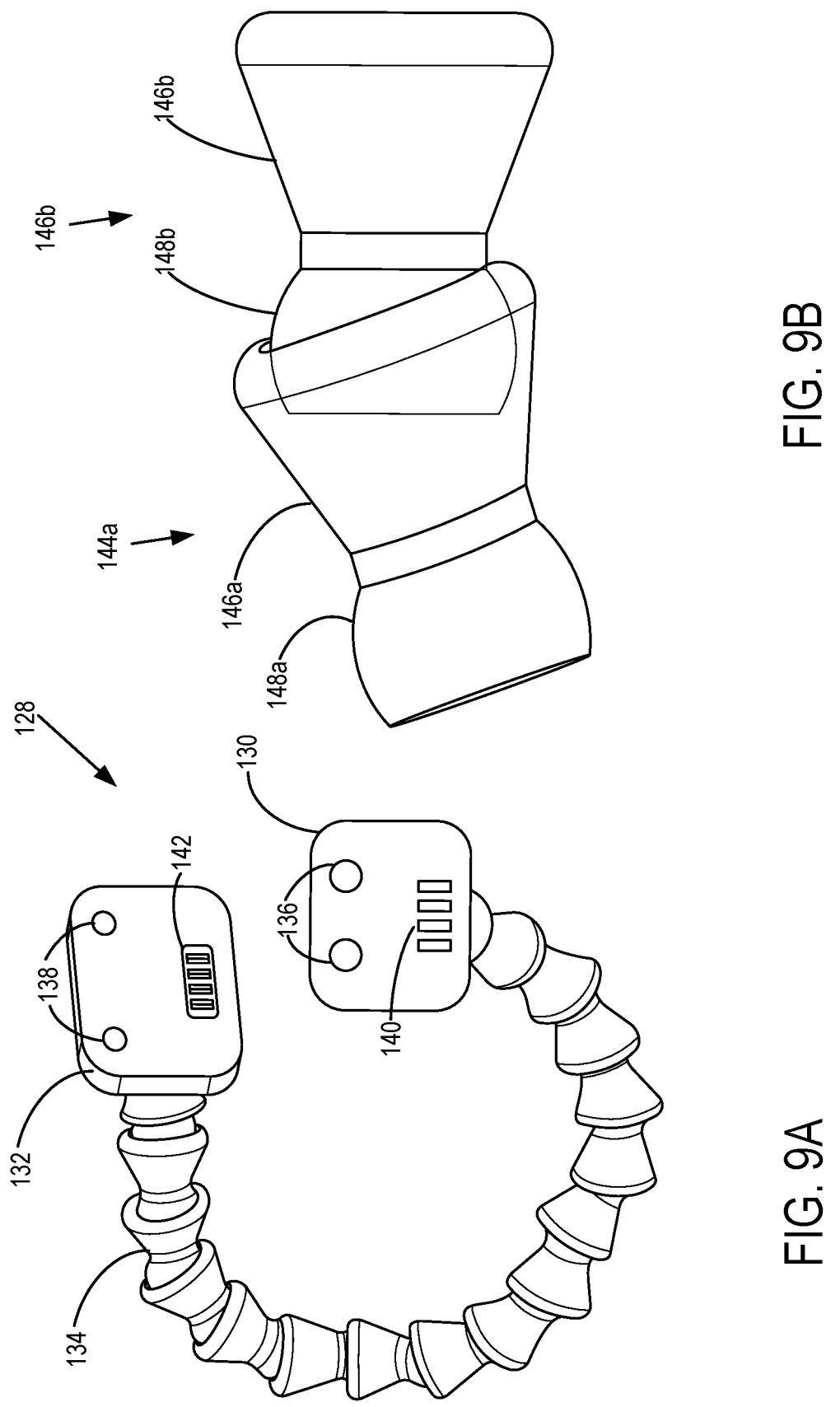
FIG. 9A illustrates a flexible connector, according to an example embodiment.
FIG. 9B illustrates links of a flexible connector, according to an example embodiment.

FIGS. 9A and 9B illustrate the flexible connector 128 and links 144a, 144b of the flexible connector 128, respectively, according to example embodiments. As noted above, the flexible connector 128 can be semi-rigid such that it is adjustable upon application of a force, but can remain in a fixed position to hold the removable detector housing 104 in place during use of the thermal imager device 100.

In some examples, the body 134 of the flexible connector 128 may include a series of links, such as links 144a and 144b, as shown in FIG. 9B. In these examples, each link (e.g., 144a) in the series of links can be frictionally coupled to an adjacent link (e.g., 144b). Further, each link 144a, 144b may include a conical portion 146a, 146b and a round portion 148a and 148b. The conical portion 146a of the first link 144a can be coupled to a round portion 148b of the adjacent second link 144b. This configuration allows frictional engagement and radial movement of the round portion 148b so as to permit coupling of the first link 144a with the adjacent second link 144b. This configuration also provides sufficient rigidity of the flexible connector 128 to support the removable housing detector 104 when in use, as shown in FIGS. 7A and 7B.

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

The invention claimed is:

1. A thermal imager device comprising:
   a thermal imager housing, the thermal imager housing comprising a display and user controls; and
   a removable detector housing comprising a thermal detector, a visible light camera, and a visible light integrated into the removable detector housing,
   wherein the removable detector housing comprises a first connector,
   wherein the thermal imager housing comprises a second connector, and wherein the removable detector housing is configured to detachably couple directly to the thermal imager housing by coupling the first connector to the second connector.

2. The thermal imager device of claim 1, wherein the thermal imager housing comprises a first magnetic connector, wherein the removable detector housing comprises a second magnetic connector, and wherein the thermal imager housing is configured to detachably couple to the removable detector housing by coupling the first magnetic connector to the second magnetic connector.

3. The thermal imager device of claim 1, wherein the thermal imager housing comprises a first mechanical fastener, wherein the removable detector housing comprises a second mechanical fastener, and wherein the thermal imager housing is configured to detachably couple to the removable detector housing by coupling the first mechanical fastener to the second mechanical fastener.

4. The thermal imager device of claim 1, wherein the thermal imager housing comprises a negative cavity, and wherein the thermal imager housing is configured to detachably couple to the removable detector housing by the negative cavity receiving the removable detector housing.

5. The thermal imager device of claim 1, wherein the thermal imager housing comprises a first electrical component, wherein the removable detector housing comprises a second electrical component, and wherein the first electrical component on the thermal imager housing is configured to electrically couple to the second electrical component on the removable detector housing.

6. The thermal imager device of claim 5, wherein when the thermal imager housing is electrically coupled to the removable detector housing, the thermal imager housing is configured to send data to and receive data from the removable detector housing.

7. The thermal imager device of claim 1, wherein the thermal imager housing comprises a first communication unit, wherein the removable detector housing comprises a second communication unit, and wherein the first communication unit and the second communication unit are configured to communicate via a wireless connection.

8. The thermal imager device of claim 1, wherein the thermal imager housing is coupled to a handle, and wherein the handle comprises a trigger button.

9. The thermal imager device of claim 1, wherein the thermal imager housing further comprises a computing device.

10. The thermal imager device of claim 1, wherein the removable detector housing further comprises a power source.

11. A thermal imager device comprising:
   a thermal imager housing comprising a display, user controls, and a computing device, wherein the computing device comprises at least one processor and a data storage comprising program instructions stored thereon that when executed by the at least one processor cause the thermal imager device to perform at least one function; and
   a removable detector housing comprising a thermal detector, a visible light camera, and a visible light integrated into the removable detector housing,
   wherein the removable detector housing comprises a first connector,
   wherein the thermal imager housing comprises a second connector, and wherein the removable detector housing is configured to detachably couple directly to the thermal imager housing by coupling the first connector and the second connector.

12. The thermal imager device of claim 11, wherein the thermal imager housing is coupled to a handle, wherein the handle comprises a trigger button, and wherein the trigger button is communicably coupled to the computing device.

13. The thermal imager device of claim 11, wherein the processor is communicatively coupled to the thermal detector.

14. The thermal imager device of claim 11, wherein the removable detector housing comprises a second computing device, the second computing device comprising at least one processor and a data storage comprising program instructions stored thereon that when executed by the at least one processor, cause the thermal detector to perform an operation.

15. The thermal imager device of claim 14, wherein when the thermal imager housing is electrically coupled to the removable detector housing, the computing device of the thermal imager housing sends instructions to the thermal detector.

16. The thermal imager device of claim 14, wherein the computing device of the thermal imager housing further comprises a first communication unit and the second computing device of the removable detector housing further comprises a second communication unit, and wherein the first communication unit and the second communication unit are configured to communicate via a wireless connection.

17. The thermal imager device of claim 11, wherein the thermal imager housing further comprises a first electrical component, wherein the removable detector housing comprises a second electrical component, and wherein the first electrical component on the thermal imager housing is configured to electrically couple to the second electrical component on the removable detector housing.

18. The thermal imager device of claim 17, wherein the thermal detector is configured to send data to the at least one of the computing device of the thermal imager housing and the display of the thermal imager housing.

19. The thermal imager device of claim 11, further comprising a flexible connector configured to detachably couple the removable detector to the thermal imager housing, the flexible connector comprising a first end, a second end, and a body between the first end and the second end, wherein the flexible connector is configured to detachably couple to the thermal imager housing at the first end, and wherein the flexible connector is configured to detachably couple to the removable detector housing at the second end.

20. The thermal imager device of claim 11, wherein the removable detector housing further comprises a power source.

* * * * *